United States Patent
Beger

Patent Number: 5,351,348
Date of Patent: Oct. 4, 1994

[54] REST PAD FOR AN INFANT

[76] Inventor: Udo Beger, Lindenstrasse 2, 8300 Landshut, Fed. Rep. of Germany

[21] Appl. No.: 47,951

[22] Filed: Apr. 9, 1993

Related U.S. Application Data

[63] Continuation of Ser. No. 838,580, Feb. 19, 1992, abandoned.

[30] Foreign Application Priority Data

Mar. 14, 1991 [DE] Fed. Rep. of Germany ... 9103105[U]

[51] Int. Cl.$^5$ .................. A47G 9/06; A47C 21/08
[52] U.S. Cl. .................................... 5/420; 5/427; 5/655
[58] Field of Search ............ 5/417, 419, 420, 424, 5/425, 427, 452, 513, 655

[56] References Cited

U.S. PATENT DOCUMENTS

| | | | |
|---|---|---|---|
| 1,624,797 | 4/1927 | Morehouse | 5/417 |
| 3,537,116 | 11/1970 | Kain | 5/420 |
| 3,689,947 | 9/1972 | Wolf | 5/419 |
| 4,231,125 | 11/1980 | Tittl | 5/419 |
| 4,607,402 | 8/1986 | Pollard | 5/425 |
| 4,670,923 | 6/1987 | Gabriel et al. | 5/424 |
| 4,754,509 | 7/1988 | Pollard | 5/425 |
| 4,788,726 | 12/1988 | Rafalko | 5/424 |
| 4,800,600 | 1/1989 | Baum | 5/424 |
| 4,890,346 | 1/1990 | Rist | 5/427 |
| 4,999,866 | 3/1991 | Lindsey | 5/427 |
| 5,035,013 | 7/1991 | Bloom | 5/424 |

FOREIGN PATENT DOCUMENTS

| | | | |
|---|---|---|---|
| 2585228 | 1/1927 | France | 5/427 |
| 1209228 | 1/1960 | France | 5/420 |
| 795742 | 5/1958 | United Kingdom | 5/427 |
| 868320 | 5/1961 | United Kingdom | 5/427 |
| 2113990 | 8/1983 | United Kingdom | 5/452 |

*Primary Examiner*—Peter M. Cuomo
*Assistant Examiner*—Michael Milano
*Attorney, Agent, or Firm*—Harris, Tucker & Hardin

[57] ABSTRACT

A rest pad (1,1$^1$) for an infant is described, which is provided with a preferably padded bottom (2,2$^1$) delimited on at least one side thereof by an essentially straight, elevated rim section (3,3$^1$), said elevated rim section (3,3$^1$) being formed by a filling material, which is received in a hollow reception space such that it can be removed therefrom for the purpose of lowering said rim section (3,3$^1$). In order to be able to use such a rest pad universally and with variable sizes, it is suggested that the hollow reception space should be defined by a loop (3a to 3d, 3$^1$a to 3d) connected via a predetermined bending boundary (4a to 4d, 4$^1$a to 4$^1$d) to the bottom (2,2$^1$) in such a way that, for increasing or reducing the size of the rest pad, said loop, together with the filling material, can be folded inwards towards said bottom (2,2$^1$) and outwards away from said bottom.

10 Claims, 3 Drawing Sheets

REST PAD FOR AN INFANT

CROSS REFERENCE TO RELATED APPLICATION

This application continues the subject matter of my prior U.S. Pat. No. application Ser. No. 07/838,580 filed Feb. 19, 1992, now abandoned, based on foreign application G 91 03 109.5 filed in Germany on Mar. 14, 1991, for which benefit under 35 U.S.C. §§119 and 120 is claimed.

BACKGROUND

The present invention refers to a rest pad of the type explained in the generic clause of claim 1.

Such a rest pad, which can also be used for an infant, is known from U.S. Pat. No. 4,607,402. The known rest pad consists of a sort of tension sheet mounted on a bottom defined by a mattress. Along the edges of said tension sheet, strips of a textile material are sewed on in such a way that they define essentially semicircular tunnels into which rolls of foam material can be introduced. The strips have their two longitudinal edges sewed on the tension sheet in spaced relationship with each other, the distance between said longitudinal edges being equal to or slightly larger than the diameter of the rolls of foam material. The inserted rolls of foam material will thus be secured in position relative to the tension sheet and, consequently, relative to the mattress. This, however, means that the available resting area of the rest pad has a fixed size, which cannot be varied.

An additional rest pad for an infant of the type mentioned hereinbefore is known from U.S. Pat. No. 3,761,975. The known rest pad consists of a sort of air mattress having a flat, non-inflatable bottom and a hollow reception space, which extends around said bottom and into which air can be blown for elevating the whole outer rim of the bottom and not only rim sections. Also the elevated rim of this rest pad is fixed in position relative to the bottom and cannot be varied. Moreover, the possibilities of use of this rest pad are strongly limited, since only the rim as a whole, but not merely selected rim sections, can be lowered by letting off air.

A floor carpet with protective seals is known from French patent No. 1,209,288 as a playpen carpet for children. Rim sections (seals) made integral with the flat part of the carpet are located inwardly from the outer edges of the carpet. The seals are formed from impermeable and elastic material, such as plastic. While the seals are deformable while undergoing elastic stress, they bring the carpet back into the normal deployed position. In case of making use of the carpet with a playpen, it is made integral with the playpen and the seal then rests against the lower periphery on the inside and/or outside of the playpen. A number of different rest pads are shown of different constructions. From the fact that such rest pads can have a different size depending on the needs or certain requirements, the conclusion cannot be drawn that a certain fabricated rest pad can be varied in its useable size by means of foldable rim elements attached thereto to the bottom area.

Also, a cover for the base of a child's playpen is known from French patent publication No. 2,585,228, having cylindrical cushions attached to central blanket edges to form a safety means which define borders which prevent a child from putting feet outside the pen bars to reduce risk of injury. The borders are tightly drawn against the base by elastic straps arranged near opposite ends so that the border cushions can leave a maximum amount of interior space for a child and toys. There is nothing to suggest folding borders inwardly or outwardly to change the shape or size of the base rest area as in the present invention.

Hence, the present invention is based on the task of providing a rest pad, which can be used universally and which is variable in size. This task is solved by the characterizing features of claims 1 and 13.

SUMMARY OF THE INVENTION

Due to the predetermined bending boundary provided in accordance with the present invention, the elevated rim sections can, for example, be folded inwards, if the rest pad according to the invention is intended to be used in a narrow playpen or crib. If the rest pad is to be used as a blanket on which the infant can crawl, the rim sections will be folded outwards so that the largest possible bottom area will be obtained without reducing the restraining effect of the elevated rim section or rim sections. Notwithstanding this, the rest pad according to the present invention can be flattened by removing the filling material and it can be stored in a folded condition like a conventional blanket. In addition to the above-mentioned use as an insert in cribs or playpens or as a blanket on which the infant can crawl, there is also the possibility of using the rest pad according to the invention as a nursery pad for changing the infant's napkins, and in this case, it will be expedient to flatten the rim section facing the person who changes the infant's napkins because this will facilitate the work which has to be done.

The measure of providing the predetermined bending boundary in the form of an attachment seam of the loop according to claim 2 permits a particularly simple mode of production.

On the basis of the structural design according to claim 3, the size of the rest pad can easily be varied in two different directions.

The production will be rendered even more simple, if the loop consists of the material of which the bottom is made in accordance with claim 4. If the bottom material is padded, also the rim sections will thus be padded additionally according to features of claim 6.

On the basis of the structural design according to claim 5, the peripheral rim sections are easily flattened and reelevated independently by removing or inserting filling material.

On the basis of the features of claim 7, the size of the bottom surface can be varied still further according to requirements. It can, for example, be desirable to halve the bottom size of the rest pad, when said rest pad is used as a nursery pad for changing the infant's napkins, the non-used half being then folded backwards.

When, in accordance with claim 8, air is used as a filling material, the rest pad can be stored even more easily. Notwithstanding this, it is, of course, possible to use e.g. a roll of foam material or some other type of preformed filling material.

For accommodating the air, it will be expedient to use an inflatable, hose-like balloon in accordance with claim 9; said balloon is inserted into the hollow reception space and removed therefrom according to requirements, or it is fixed within the hollow reception space from the very beginning and blown up or opened, if required.

According to claim 10, at least one rim section is detachably connected.

On the basis of the structural design according to claims 11-12, the rest pad according to the present invention can be combined with a second rest pad, which is either constructed in accordance with the present invention or equipped in a conventional manner, so as to form one larger surface. The measure according to claim 12 guarantees in this case that the zipper parts are covered so as to avoid injuries.

BRIEF DESCRIPTION OF THE FIGURES

In the following, embodiments of the present invention will be explained in detail on the basis of the drawings, in which.

DETAILED DESCRIPTION

Figure 1:
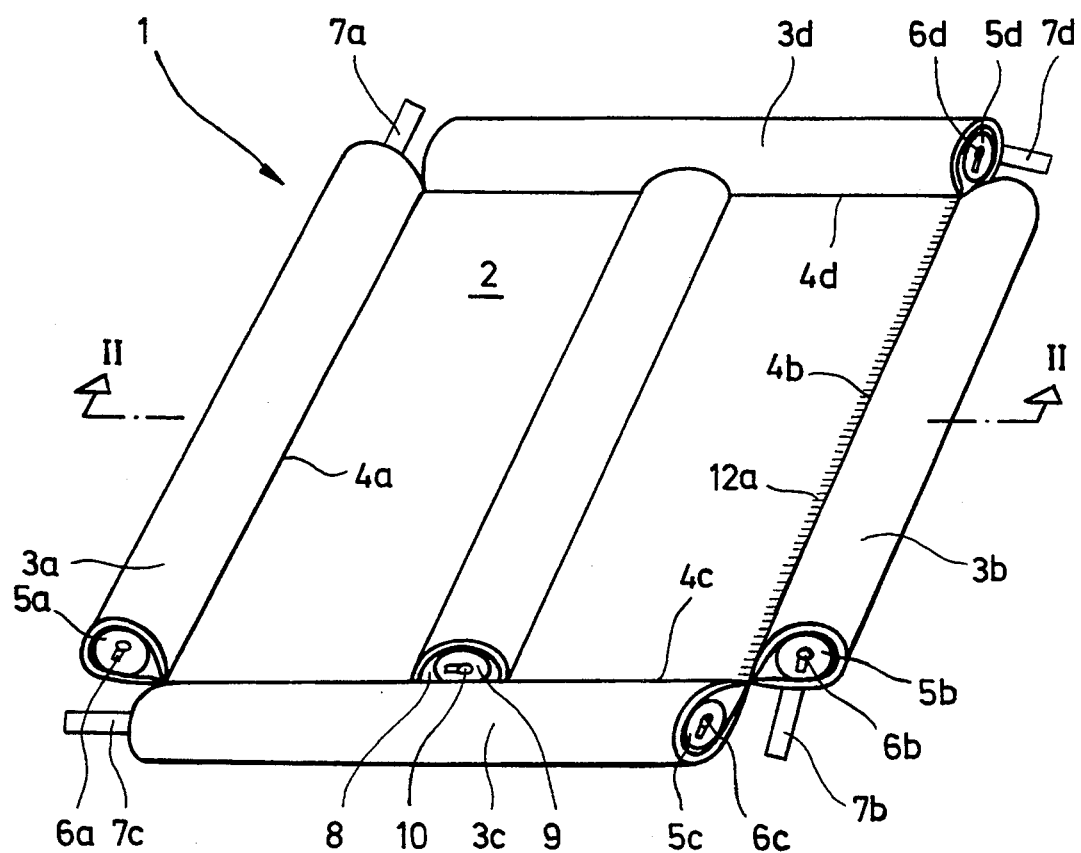
FIG. 1 shows a perspective view of a first embodiment of the present invention with folded-out rim sections.
Figure 2:
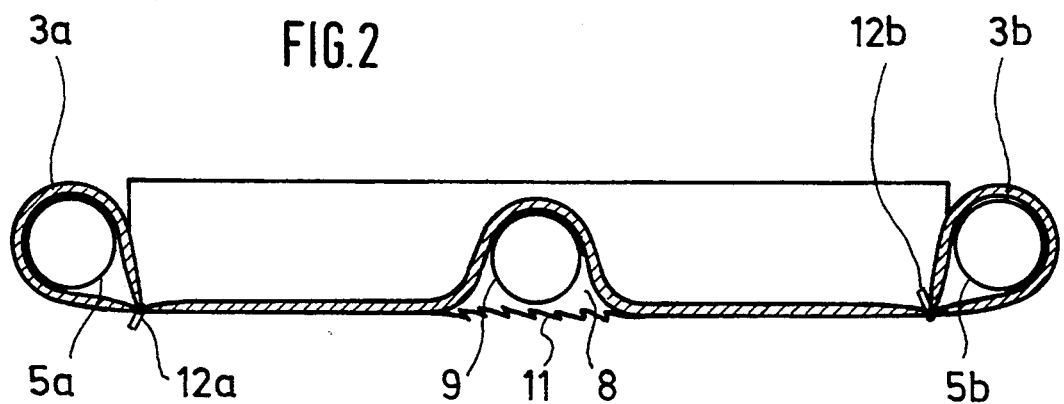
FIG. 2 shows the section II—II of FIG. 1.

FIG. 1 and 2 show a rest pad 1 for an infant, which is provided with a quadrangular (FIG. 1 square, FIG. 2 rectangular) bottom 2 consisting of a wadded material. Each of the four straight sides of the bottom 2 has arranged thereon a continuous loop $3a$, $3b$, $3c$, $3d$. Each loop 3 was formed by turning extension flaps, which consist of the material of the bottom 2, at the respective edge upwards and inwards or downwards and outwards and by sewing them then on the bottom 2 by means of an attachment seam $4a$, $4b$, $4c$, $4d$. The loops $3a$ to $3d$ thus define hollow reception spaces whose length corresponds to the length of the abutting edge portion of the bottom 2. Air-filled, cylindrical, balloon-like hoses $5a$, $5b$, $5c$, $5d$ are introduced into the hollow reception spaces. The length of each of said hoses 5 corresponds to that of the loop 3 associated therewith; it is, however, just as well possible to accommodate in each loop 3 or in selected ones of said loops 3 two or more of these hoses. Each hose 5 is provided with a valve $6a$, $6b$, $6c$, $6d$, which is located at the end face thereof and which is adapted to be used for inflating the hoses and for letting off the air acting as a filling material. The valves 6 can, for example, be constructed in the manner of air mattress valves.

The attachment seams $4a$ to $4d$ are constructed as predetermined bending boundaries so that each of the loops 3 can be folded inwards onto the bottom 2, whereupon the loops 3 and the filling material contained therein complement each other and form a complete rim surrounding the periphery of the bottom 2 with one end face of a folded-in rim section abutting on the neighboring rim section. Depending on the number of folded-up rim sections as well as on the manner and on the sequence in which said rim sections are folded, different sizes of the rest pad will be obtained. For the purpose of fixing the loops 3 in this position also in cases in which said loops do not abut on a playpen or crib, connection means in the form of self-adhering strips $7a$, $7b$, $7c$, $7d$ are provided.

Transversely across the bottom 2, from the loop $3c$ to the loop $3d$, an additional hollow reception space 8 for one or for several air-filled hoses 9 extends, a valve 10 being again provided. The hollow reception space 8 is, as can also be seen in FIG. 2, formed by a bulge in the wadded bottom material, said bulge being covered on the underside by a connection strip 11, which consists of thin cloth and which has a sufficient width, so that the bottom material forming the hollow reception space can be flattened again, when the air-filled hose has been removed or deflated.

In order to be able to connect, if necessary, the rest pad 1 according to the present invention with an additional rest pad having the same structural design, a disengageable zipper 12 is provided, the parts $12a$, $12b$ of said zipper being respectively arranged in the vicinity of the attachment seams $4a$, $4b$ at opposite sides of the bottom 2. One part $12a$ of the zipper is arranged on the underside of the rest pad 1, whereas the other part $12b$ is arranged on the upper side thereof. The respective abutting loops $3a$, $3b$ will thus cover in the flat condition, i.e. when the falling material has been removed, the zipper connection between two connected rest pads. The zipper components can, of course, also be arranged on the outermost edges of the loops in the flat condition.

Figure 3:
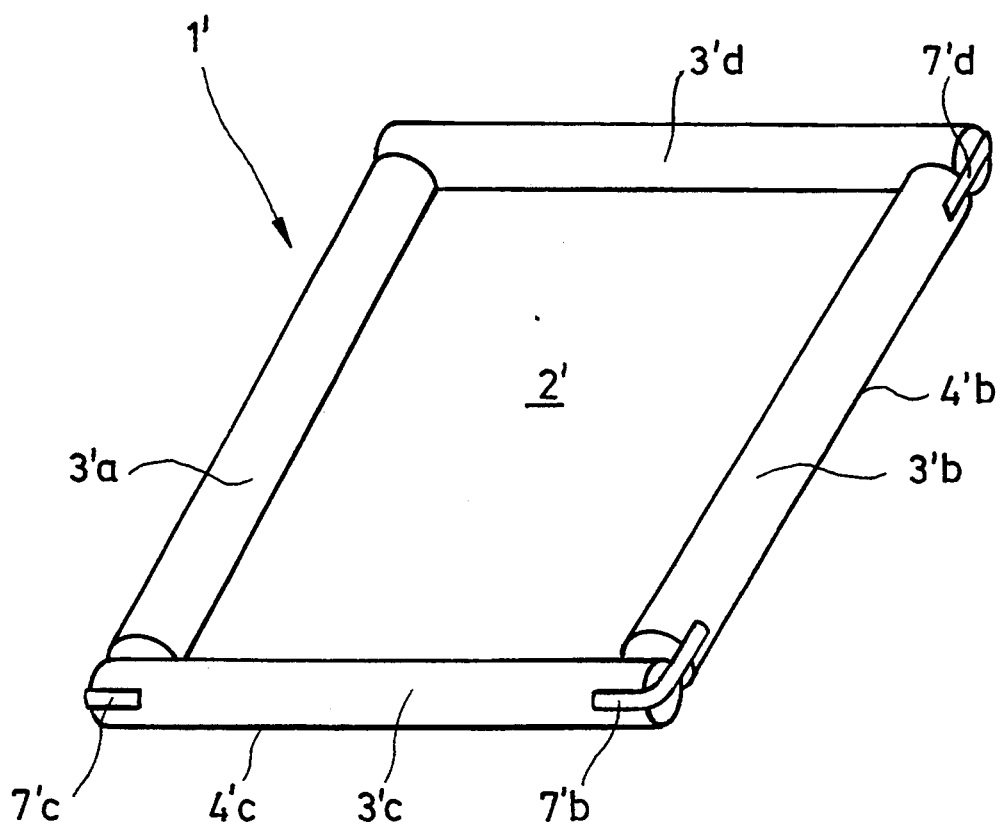
FIG. 3 shows a perspective view of a second embodiment of the present invention with folded-up rims.

FIG. 3 shows an additional, simplified embodiment of a rest pad $1^1$, in the case of which parts which are comparable with the embodiment according to claim 1 were provided with the same reference numerals, supplemented by a prime, and will not be explained again. Rest pad $1^1$ has essentially the same structural design and is produced in essentially the same manner as rest pad 1, but it is not provided with the central hollow reception space 8 and it has a square bottom $2^1$. The rest pad $1^1$ is shown in FIG. 3 with its loops $3^1a$ to $3^1d$ folded up, said loops $3^1$ being held in the folded-up position by the fastening strips $7^1a$ to $7^1d$. By means of this folding up of the loops, it is possible to simultaneously vary the shape and the size of the outer contour in the way desired (square-rectangular).

Figure 4:
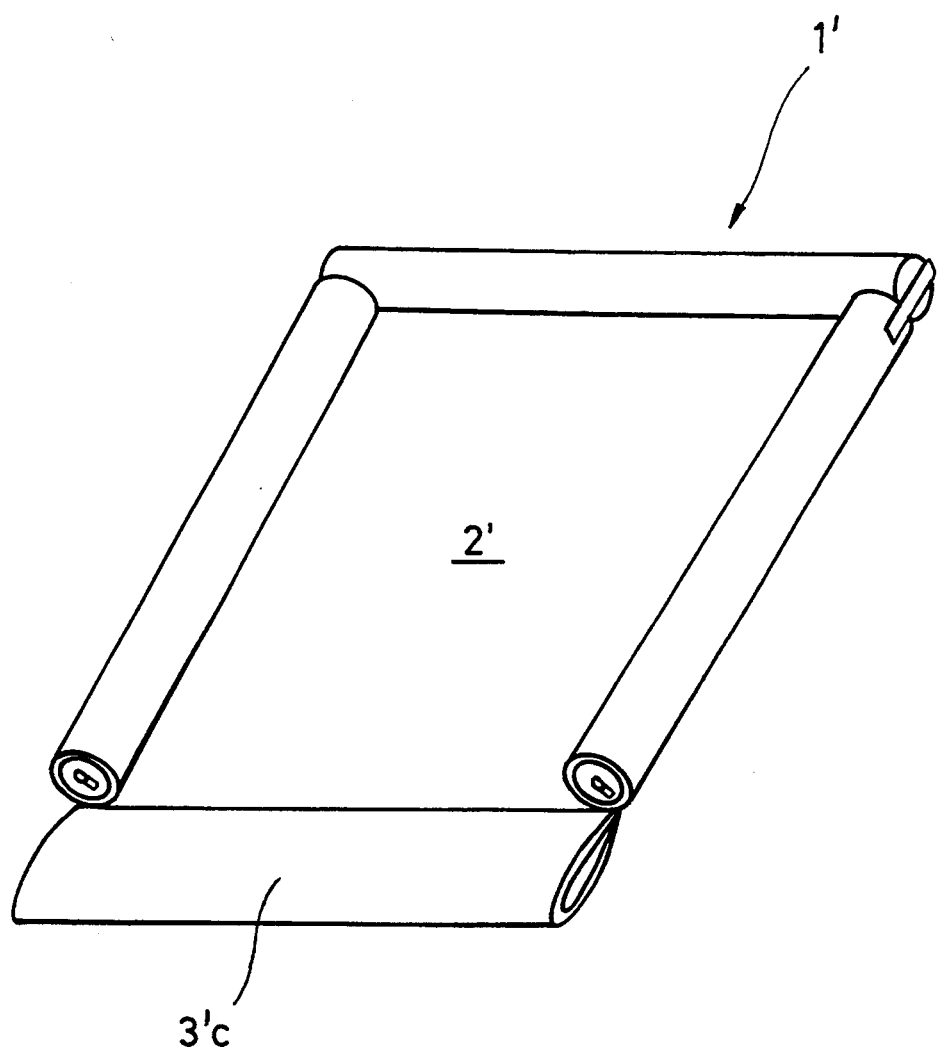
FIG. 4 shows a perspective view of the rest pad according to FIG. 3 used as a nursery pad for changing the infant's napkins.

FIG. 4 shows the use of the rest pad $1^1$ as a nursery pad for changing the infant's napkins, in the case of which the filling material has been removed from the front loop $3^1c$, and said loop has been flattened.

However, also the rest pad according to FIG. 1 can be used as a blanket on which the infant can crawl or as an insert with four elevated rim sections as well as a nursery pad for changing the infant's napkins; in cases in which the rest pad is used e.g. as a nursery pad for changing the infant's napkins, the hollow space provided in the bottom can be filled, whereas the non-required parts of the rim sections can be deflated, whereupon said rim sections can be turned down. For this type of use, it will be advantageous, when each of the rim sections, which extend at right angles to the hollow space in the bottom, includes two air-filled hoses. The rest pad according to the present invention can additionally be used as an insert for a child's bed with slatted walls, the elevated rim sections, especially those at the slatted walls, providing protection against the infant's attempts to pass through its feet. The same advantages will be achieved when the rest pad according to the present invention is inserted into a playpen.

As a modification of the embodiments described and shown hereinbefore, the loops themselves can be impermeable to air and provided with the valves so that an additional hose will not be necessary. Instead of air, some other filling material, such as a roll of foam material or a roll filled with quilting cotton, can be used. Additional hollow reception spaces in the bottom can also be provided in the transverse direction or at any location where they may be required. The connection means used may also be self-adhering fasteners or the like. The loop can be prefabricated and then be attached by sewing or in some other way. In accordance with the respective requirements, the rim sections, which are adapted to be elevated, may also be provided on only one, two or three sides of the bottom. However, by means of the embodiment according to the present invention, the desired shape of the rim sections can easily be determined by removing the filling material from the rim section which is not intended to be elevated, e.g. the front side in the case of a nursery pad for changing the infant's napkins.

What is claimed is:

1. A rest pad for an infant, having a bottom comprising a multiple-sided padded central rest area with elevatable rim sections connected to the associated adjacent side of the padded central rest area, said rim sections comprising hollow reception spaces formed by loops to accommodate a filling material in each of said loops for elevating same, said loops consisting of a material of which the padded central rest area is made and said loops being formed by turning over the outside edge of said material so that the rim section is padded additionally, each of said rim sections having a length corresponding to that of the adjacent side of the central rest area connected thereto by a foldable bending boundary such that by folding up the loops the shape and the size of the central rest area is simultaneously variable, alternatively folding neighboring rim sections inwards towards the central rest area or outwards away from said central rest area whereby same can be narrowed or extended depending on the folding actuation of the rim sections.

2. A rest pad as defined in claim 1, wherein the foldable bending boundary is defined by an attachment seam through which each loop is foldably attached to the adjacent side of the central rest area.

3. A rest pad as defined in claim 1, wherein the central rest area has a rectangular or square shape with each of four elevatable rim sections connected by a continuous attachment seam to one of four adjacent sides of the central rest area, each two opposite elevated rim sections being foldable independently from remaining other two opposite elevated rim sections.

4. A rest pad as defined in claim 1, wherein the filling material is conveniently removable or insertable into the respective rim section permitting flattening or elevating of same independently of flattening or elevating any other rim section.

5. A rest pad as claimed in claim 1, wherein at least one portion of the central rest area comprises an extra hollow reception space for receiving therein removable filling material which allows the central rest area to be further sub-divided.

6. A rest pad as claimed in claim 1, wherein the filling material is air.

7. A rest pad as claimed in claim 6, wherein the air is contained in an inflatable hose-like balloon which is provided with a valve and which is adapted to be inserted into the hollow reception space of the rim section or an extra hollow reception space of the central rest area.

8. A rest pad as defined in claim 1, wherein at least one of the rim sections is detachably connected to the adjacent side of the central rest area.

9. A rest pad as claimed in claim 8, wherein connection means are provided for interconnecting two rest pads to each other.

10. A rest pad as defined in claim 9, wherein said connection means comprises one part of a disengageable zipper fixed to the upper side of a foldable predetermined boundary along one rim section and that another part of said zipper is fixed to the underside of the foldable predetermined bending boundary of another rest pad.

* * * * *